US009823805B1

United States Patent
DiLorenzo (10) Patent No.: US 9,823,805 B1
(45) Date of Patent: *Nov. 21, 2017

(54) PRESENTATION BROWSER (71) Applicant: SONIFI SOLUTIONS, INC., Sioux Falls, SD (US)

(72) Inventor: Mark DiLorenzo, Laguna Beach, CA (US)

(73) Assignee: SONIFI SOLUTIONS, INC., Sioux Falls, SD (US)

( * ) Notice: Subject to any disclaimer, the term of this patent is extended or adjusted under 35 U.S.C. 154(b) by 690 days.

This patent is subject to a terminal disclaimer.

(21) Appl. No.: 14/021,788

(22) Filed: Sep. 9, 2013

Related U.S. Application Data (63) Continuation of application No. 12/190,415, filed on Aug. 12, 2008, now Pat. No. 8,572,483.

(51) Int. Cl.
*G06F 17/30* (2006.01)
*G06F 3/0481* (2013.01)

(52) U.S. Cl.
CPC ............................ *G06F 3/0481* (2013.01)

(58) Field of Classification Search
CPC ...................... G06F 17/30905; G06F 9/4443
See application file for complete search history.

(56) References Cited

U.S. PATENT DOCUMENTS

| 6,212,536 | B1* | 4/2001 | Klassen | G06F 17/3089 |
| | | | | 707/E17.116 |
| 6,226,642 | B1 | 5/2001 | Beranek et al. | |
| 6,300,947 | B1* | 10/2001 | Kanevsky | G06F 17/30905 |
| | | | | 707/E17.121 |
| 6,396,500 | B1* | 5/2002 | Qureshi | G06F 17/30905 |
| | | | | 345/418 |
| 6,456,305 | B1* | 9/2002 | Qureshi | G06F 17/30905 |
| | | | | 707/E17.121 |
| 6,757,707 | B1* | 6/2004 | Houghton | H04N 5/4401 |
| | | | | 348/E5.105 |
| 7,263,712 | B2 | 8/2007 | Spencer | |
| 7,752,256 | B2 | 7/2010 | Bloch et al. | |
| 8,341,678 | B1 | 12/2012 | Du Val | |
| 8,572,483 | B1* | 10/2013 | DiLorenzo | G06F 17/30905 |
| | | | | 709/203 |
| 9,172,768 | B2* | 10/2015 | Stefanik | H04L 67/36 |
| 2003/0014762 | A1* | 1/2003 | Conover | H04N 7/173 |
| | | | | 725/110 |

(Continued)

OTHER PUBLICATIONS

Official Action for U.S. Appl. No. 12/190,415, dated Aug. 30, 2011, 17 pages.

(Continued)

*Primary Examiner* — Scott Baderman
*Assistant Examiner* — Mario M Velez-Lopez
(74) *Attorney, Agent, or Firm* — Sheridan Ross P.C.

(57) ABSTRACT

Methods, devices, and systems for browsing websites are provided. More specifically, a presentation browser application and method are provided that allows a user to browse content available from the World Wide Web using a display device and relatively limited user input device. The content is presented in a presentation skin selected from a number of available presentation skins. The presentation browser application is particularly useful for browsing the Internet with a television or the like.

20 Claims, 9 Drawing Sheets

(56) References Cited

U.S. PATENT DOCUMENTS

| | | | |
|---|---|---|---|
| 2003/0097397 A1* | 5/2003 | Giannetti | G06F 17/211 |
| | | | 709/201 |
| 2003/0182628 A1* | 9/2003 | Lira | G06F 3/0485 |
| | | | 715/252 |
| 2004/0254915 A1* | 12/2004 | Motoyama | G06F 17/30516 |
| 2005/0021609 A1* | 1/2005 | Houghton | H04N 5/4401 |
| | | | 709/203 |
| 2005/0024355 A1* | 2/2005 | Yagi | G06F 3/0481 |
| | | | 345/204 |
| 2005/0108655 A1 | 5/2005 | Andrea et al. | |
| 2005/0234893 A1 | 10/2005 | Hirsch | |
| 2006/0184875 A1 | 8/2006 | Okada et al. | |
| 2008/0184163 A1* | 7/2008 | White | G06F 3/0236 |
| | | | 715/798 |
| 2008/0195744 A1 | 8/2008 | Bowra et al. | |
| 2008/0222283 A1 | 9/2008 | Ertugrul et al. | |
| 2008/0229359 A1 | 9/2008 | Robinson | |
| 2009/0043785 A1 | 2/2009 | Garward et al. | |
| 2009/0182619 A1* | 7/2009 | Menditto | G06Q 30/02 |
| | | | 705/14.64 |
| 2011/0050990 A1 | 3/2011 | Farkash | |
| 2015/0040000 A1* | 2/2015 | Rice | G06F 17/227 |
| | | | 715/235 |

OTHER PUBLICATIONS

Official Action for U.S. Appl. No. 12/190,415, dated Mar. 26, 2012, 18 pages.

Official Action for U.S. Appl. No. 12/190,415, dated Jul. 18, 2012, 21 pages.

Official Action for U.S. Appl. No. 12/190,415, dated Dec. 19, 2012, 19 pages.

Notice of Allowance for U.S. Appl. No. 12/190,415, dated Jun. 7, 2013, 19 pages.

* cited by examiner

PRESENTATION BROWSER

CROSS REFERENCES TO RELATED APPLICATIONS

This application is a continuation of U.S. patent application Ser. No. 12/190,415 filed Aug. 12, 2008, the entire content of which is hereby incorporated by reference.

FIELD OF THE INVENTION

The invention relates generally to a presentation browser adapted for presenting website content to a user.

BACKGROUND

Computers are becoming a significant source of entertainment and the desire to integrate the Internet and the television is growing. In particular, people who are continually turning to websites as a source of entertainment also want to watch that streamed content on their television, for example when a general purpose computer is not available or would be inconvenient to use.

The difficulty associated with providing website content via a television is that traditional televisions are not usually equipped to retrieve and render all of the html code provided by web servers. In other words, televisions are not natively adapted to understand html code nor are they natively adapted to display the web content in its intended format.

Similarly, current web browsing applications are specifically designed for use with computers and other processing devices. Currently available web browsing applications are not designed for use with televisions and other display devices that have limited processing capabilities and/or a relatively simple user input device.

SUMMARY

These and other needs have been addressed by embodiments of the present invention. The present invention is generally directed toward a presentation browser that is adapted for use with televisions and other display devices. The presentation browser may be used to deliver content from the Internet, including video, audio, images, and/or text content, through a television or similar display device. Embodiments of the present invention overcome many of the difficulties inherent in providing content from web pages using or in connection with terminal devices having limited processing power and/or input devices. Moreover, embodiments of the present invention provide users with consistent navigation and visual presentation.

Embodiments of the presentation browser are particularly well suited for use with television, cable systems, portable devices and other terminal devices where limited user input is available; however, the presentation browser may also be adapted for use with other terminal devices such as personal computers, laptops, phones, etc. According to certain embodiments of the present invention, the presentation browser may differ from currently available computer-based Internet browsers in that the presentation browser does not execute or render the html script of a web page, or java script or other executable or compiled code provided within the web page delivered from the server to the presentation browser. Instead, the presentation browser parses the html code to extract user metadata and content that should be output to the user. More particularly, the presentation browser can ignore some or all of the browser metadata that controls the operation of a conventional web browser in providing content to the user. As used herein, user metadata refers to metadata that is intended to be provided to the user and that provides the user with commentary on, control of, or that otherwise is about content displayed or available to the user. Browser metadata refers to metadata that is used by a conventional browser to control the presentation of content to a user, including html elements. Thus, while a traditional browser renders a webpage by interpreting browser metadata, html script, java script, and other compiled languages, the presentation browser of the present invention only accesses the user metadata and content of the website as determined by the page format applied by the presentation browser to the website. The metadata and content may then be presented in a specialized presentation skin providing a window or framework for presenting the website content that takes the place of the formatting information received from the website that would be applied if the html script were executed.

In accordance with one embodiment of the present invention, the presentation browser is provided on or in association with a terminal device, such as a television or a set top box (STB) associated with a television, and is capable of requesting and receiving html code, browser metadata, user metadata and/or content from a web content server. The presentation browser may then parse and collect selected user metadata and content from the html code without actually executing the html code. Upon parsing and collecting the user metadata and content from the html code, the presentation browser may select a first browser presentation window from a plurality of browser presentation windows that is determined to be suitable for displaying the parsed and collected user metadata and content from the website. The user metadata may be displayed in a first frame of a window of the presentation browser application and the content may be displayed in a second frame of the presentation browser application. The formats of the first and second frames may vary depending upon the nature of the user metadata and/or contents as well as the relationship between frames. In accordance with embodiments of the present invention, the presentation browser is implemented as an application comprising executable code, instructions or firmware running on a programmable processor.

In accordance with at least some embodiments of the present invention, a presentation method is also provided. The method generally comprises receiving a request for content from a website by a presentation browser and then providing the request for content to a network interface for delivery to the website. The presentation browser may then wait for a response to the request. The response that is ultimately received by the presentation browser may include html code, browser metadata, user metadata and content. The method continues by parsing the received browser metadata, user metadata and content from the response and selecting a first presentation browser window from a plurality of browser presentation windows. The selected first presentation browser window is preferably determined to be suitable for displaying content from the website. In accordance with embodiments of the present invention, the method continues with the presentation browser application displaying the received user metadata in a first frame of the first window of the presentation browser application and displaying the content in a second frame of the first window. The formats of the first and second frames may vary depending upon the nature of the user metadata, the content, the relationship between frames, or other considerations. In addition, windows may be available with any number of frames, with the number of frames being determined by what is deemed appropriate for or what has otherwise been assigned to the website being presented.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using one or more servers and/or databases, the invention is not limited to use with any particular type of communication system or configuration of system elements. Those skilled in the art will recognize that the disclosed techniques may be used in any computing application in which it is desirable to provide website browsing and presentation capabilities.

The exemplary systems and methods of this invention will also be described in relation to presentation software, modules, and associated presentation hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
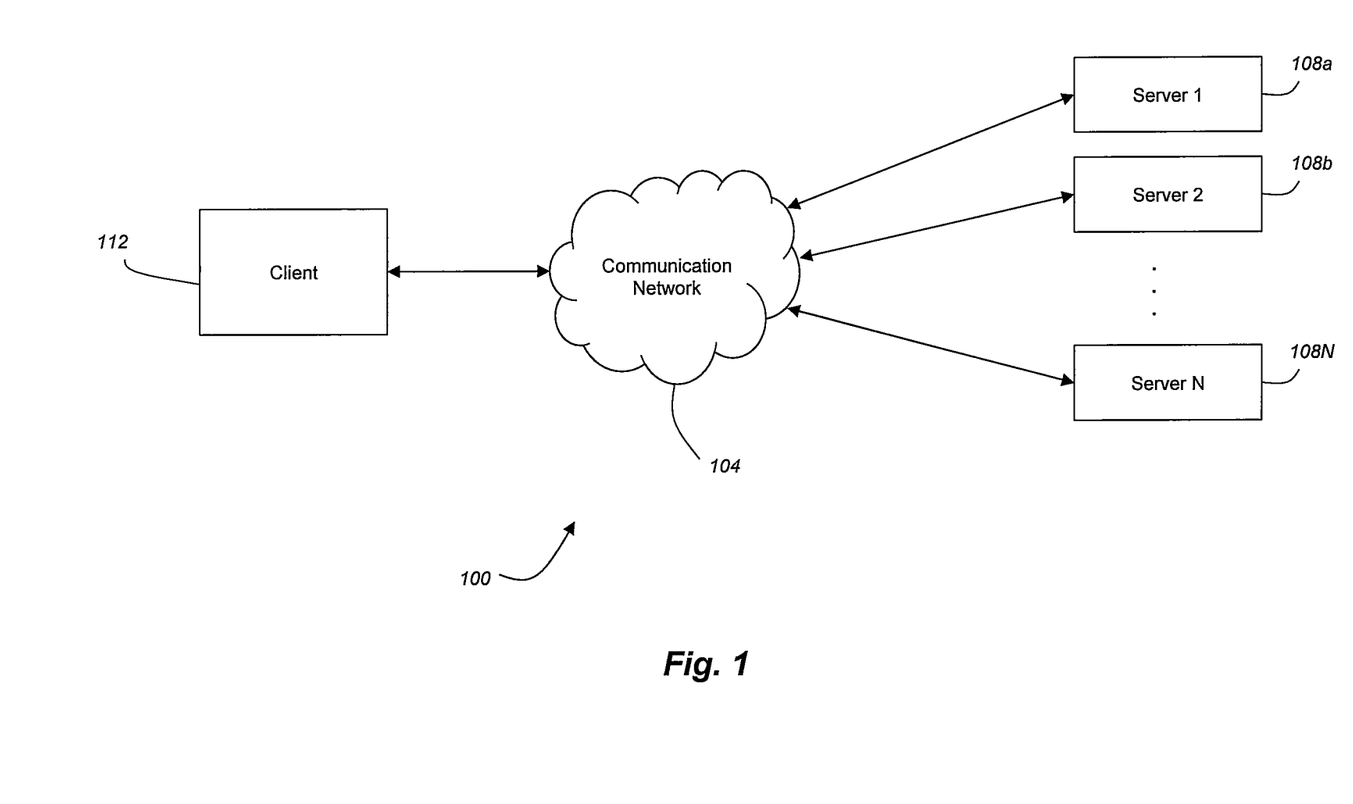
FIG. 1 is block diagram depicting a communication system in accordance with at least some embodiments of the present invention.

Referring now to FIG. 1, an exemplary communication system 100 will be described in accordance with at least some embodiments of the present invention. The communication system 100 may include a communication network 104 that connects a client 112 with a plurality of servers 108a-N. The client 112 may be adapted to send requests to one or more of the plurality of servers 108a-N via the communication network 104. Requests may be sent to multiple servers 108a-N at substantially the same time and are generally a request for data (e.g., website information, news updates, or the like) stored or managed by the target server 108. A server 108 may similarly send responses to the client 112 via the communication network 104. The responses sent to the client 112 are generally in the form of computer code (e.g., html code, java script, xml code, etc.) and may be sent over the communication network 104 in the form of data packets using, for example, TCP/IP (Transmission Control Protocol/Internet Protocol).

The communication network 104 may comprise any type of known communications network or collection of communications equipment. As an example, the communication network 104 may comprise a Local Area Network (LAN), a Wide Area Network (WAN), or any other type of enterprise communication network. As another example, the communication network 104 may comprise any type of information transportation medium and may use any type of protocols to transport messages between the client 112 and servers 108a-N. The Internet is an example of a communication network 104 that constitutes an IP network consisting of many computers and other communication devices located all over the world, which are connected through many LANs and WANs or other means. Other examples of the communication network 104 include, without limitation, a standard Plain Old Telephone System (POTS), an Integrated Services Digital Network (ISDN), the Public Switched Telephone Network (PSTN), a LAN, a WAN, a cellular communications network, and any other type of packet-switched or circuit-switched network known in the art. Still other examples of communication networks 104 that may be utilized in accordance with at least some embodiments of the present invention include a television broadcast network, such as a broadband or cable communications network, a satellite communications network, or a traditional over-air broadcast network. The communication network 104 may utilize wired and/or wireless communication technologies.

The servers 108a-N may include web servers or the like. In accordance with at least one embodiment of the present invention, the servers 108a-N are capable of maintaining and providing website content to a requesting client 112. More specifically, if a server 108 receives a request for a particular website (as identified by a unique website address or URL), the server 108 may provide a string or series of strings of executable commands to the client 112 that will enable the client 112 to render and display the website.

The client 112 is capable of receiving responses, in the form of computer code, or data such as html code, from a server 108 or collection of servers and then presenting at least some of the content included in the code. In accordance with at least one embodiment of the present invention, the client 112 is adapted to parse through the code without actually rendering or executing the code. When the client 112 parses through code, portions of that code that are considered "of interest" are flagged as such. Then the client 112 can apply a buffer to the parsed code to extract and collect only the necessary portions of the code. These necessary portions of the code are the only portions that are used to present content provided by the website to the user, the remainder of the received code is ignored. Thus, the client 112 is adapted to receive html code from a number of different websites and possibly display such websites in a relatively uniform or otherwise generic manner.

Figure 2A:
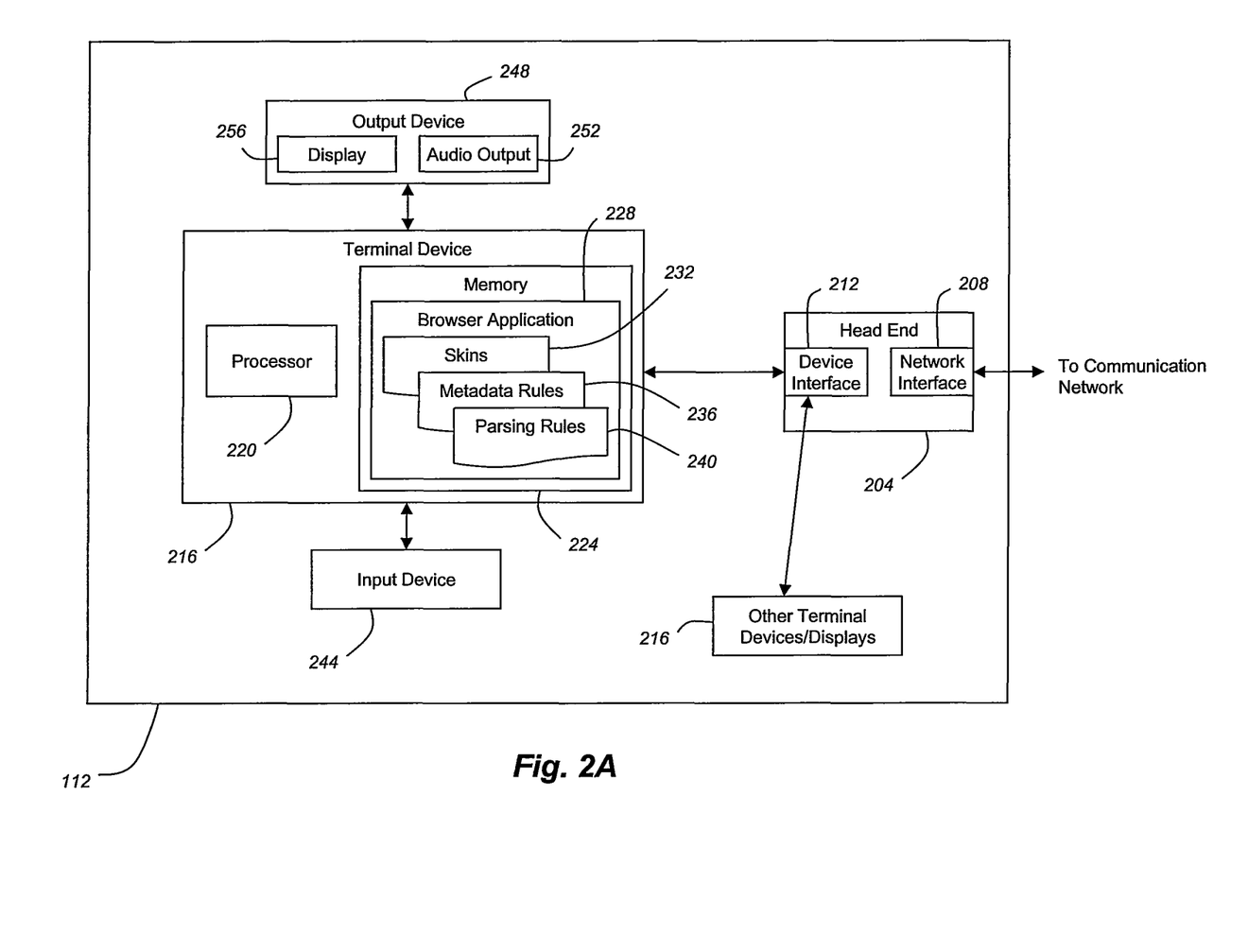
FIG. 2A is a block diagram depicting a first configuration of a client in accordance with at least some embodiments of the present invention.
Figure 2B:
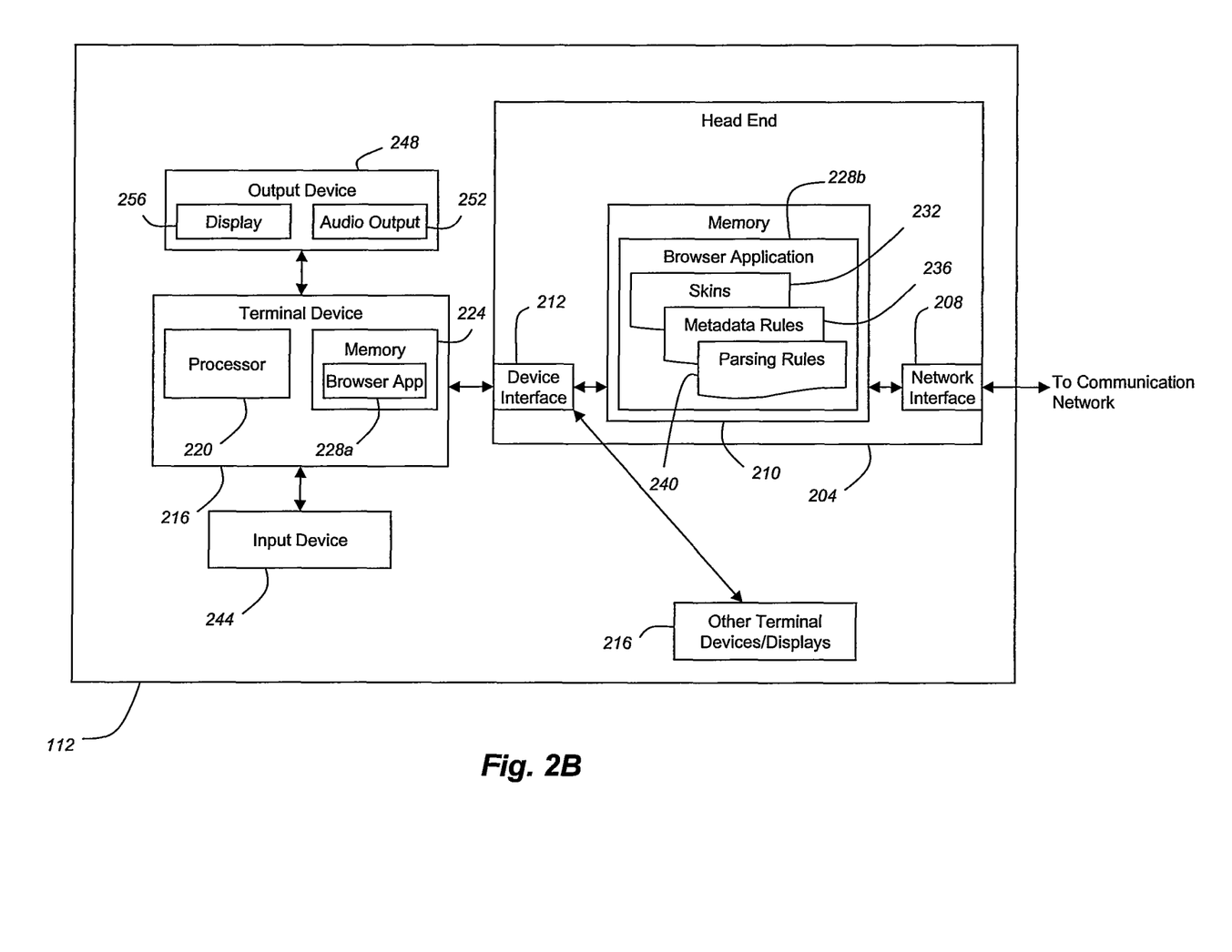
FIG. 2B is a block diagram depicting a second configuration of a client in accordance with at least some embodiments of the present invention.

Although the client 112 is depicted as having a single communication endpoint in FIG. 1, one skilled in the art will appreciate that the client 112 may include a plurality of communication endpoints. As can be seen in FIGS. 2A and 2B, a client 112 may generally correspond to a collection of terminal devices 216 and/or output devices 248 that are all connected to a common broadcast head end 204. Referring initially to FIG. 2A, the head end 204 may comprise two interfaces, a communication network interface 208 for the communication network 104 and a terminal device interface 212 for a terminal device 216. The communication network interface 208 may correspond to any known type of IP interface, such as an Ethernet port, coaxial cable interface, telephone port, or the like. The communication network interface 208 may further include a modem that is adapted for modulating signals into data packets for transmission across the communication network 104 and demodulating data packets that are received from the communication network 104. The modem of the network interface 208 may include, for example, a Digital Subscriber Line (DSL) modem, a cable modem, or the like.

The terminal device interface 212 allows the head end 204 to communicate with the one or more endpoints (i.e., terminal devices 216 and/or other output devices 248) of the client 112. As one example, the device interface 212 may comprise a coaxial cable interface and the communications between the head end 204 and terminal devices 216 and/or other output devices 248 are facilitated by coaxial cable. In such an embodiment, the head end 204 and terminal devices 216 and/or other output devices 248 may be local to one another or may be co-located on common premises (e.g., a multi-room facility such as a hotel, office building, or the like). The head end 204 and terminal devices 216, however, do not necessarily need to be co-located. In such a system configuration, the head end 204 may communicate with the terminal devices 216 over a satellite communication system, cable communication system, or other type of traditional long-distance signal broadcast system.

In accordance with at least some embodiments of the present invention, the terminal device 216 may comprise a processor 220 and memory 224. The processor 220 may be adapted to execute commands and other instructions stored in the form of applications or the like in memory 224. In accordance with one embodiment of the present invention, the memory 224 may comprise a presentation browser application 228. The presentation browser application 228 may be executed by the processor 220 when it is desired to retrieve and access information stored on the servers 108a-N. More specifically, the presentation browser application 228 may present user metadata and content obtained from the collection of web content stored and/or maintained by the servers 108a-N to a user through the display 256 and/or the audio output 252 of the output device 248. In other words, the presentation browser application 228 allows a user to browse the World Wide Web.

The presentation browser application 228 may comprise a number of presentation skins 232, metadata rules 236, and parsing rules 240 that are used to facilitate accessing web content. In one aspect, the provision of presentation skins 232, metadata rules 236, and parsing rules 240 facilitates accessing web content through a user input device 244 that is a relatively limited (e.g., a remote control or keypad). Since the user input device 244 may be relatively limited (e.g., it does not have a control module such as a mouse ball but only has binary button inputs) the presentation skins 232, metadata rules 236, and parsing rules 240 provide a framework for presenting web content. Moreover, the framework can facilitate navigation of an otherwise complex website. More specifically, the browser application 228 may utilize the presentation skins 232, metadata rules 236, and parsing rules 240 to dilute and/or ignore certain portions of the html code that would need to be acted on by a traditional browser to render and display the website. The presentation skins 232 provide a structure for displaying the user metadata and content of the website in place of the structure that would otherwise result from acting on received browser metadata, while the metadata rules 236 and parsing rules 240 are utilized to flag and extract selected user metadata and content from the html code and/or to essentially discard at least some browser metadata. The extracted user metadata and content may then be displayed within a skin, thereby allowing the browser application 228 to render a presentation of the website via the display 256 of the output device 248 without actually rendering the html code. Similarly, if at least some of the content extracted from the html code is audio content, then that content may be presented to the user via an audio output 252 of the output device 248.

In accordance with at least some embodiments of the present invention, the output device 248 may correspond to a television, phone, Personal Digital Assistant (PDA), portable email retrieval device, or the like. The input device 244 may correspond to a user input, such as a remote control adapted to operate the output device 248 (e.g., via channel selection). Alternatively or in addition, the input device 244 may comprise a user input that is directly connected or provided as part of the output device 248, the terminal device 216, or both. The input device 244 may communicate directly with the output device 248 or indirectly with the output device 248 via the terminal device 216. Although the output device 248 and input device 244 are displayed as separate elements, one skilled in the art will appreciate that a single element may comprise both the functionality of the output device 248 and input device 244. For example, a phone, PDA, portable television, laptop, or the like may integrate the input device 244 and output device 248 on a single piece of equipment.

Moreover, while the presentation browser application 228 and the processor 220 and memory 224 associated therewith are depicted as being resident on the terminal device 216, one skilled in the art will appreciate that the processor 220 and memory 224 comprising the browser application 228 may be provided directly on the output device 248. For instance, the output device 248 and the terminal device 216 may be integral to one another. As another alternative, the processor 220 and memory 242 comprising the browser application 228 may reside on the head end 204.

With reference now to FIG. 2B, an alternative configuration of the client 112 will be described in accordance with at least some embodiments of the present invention. The client 112 depicted in FIG. 2B may be similar to the client 112 depicted in FIG. 2A except that some or all of the presentation browser application 228 may reside on the head end 204 rather than on the terminal device 216. For instance, a first portion of the presentation browser application 228a may reside on the terminal device 216 while a second portion of the presentation browser application 228b may reside on the head end 204. The first 228a and second 228b portions of the presentation browser application may work cooperatively to provide the same functionality as a unified presentation browser application 228.

The second portion of the presentation browser application 228b is provided on the head end 204 in an attempt to offload at least some of the processing demands from the terminal devices 216 to the head end 204. This is particularly useful for facilities having terminal devices 216 with a first browser application 228a comprising a legacy browser application 228a (e.g., an older version of the browser application that has a limited ability to parse html code). The legacy browser application 228a provided on the terminal device 216 may only be capable of rendering input received from the head end 204 for display at the output device 248. Thus, the portion of the presentation browser application 228b on the head end 204 is responsible for parsing html code received at the network interface 208 (i.e., applying metadata rules 236 and parsing rules 240) as well as placing the parsed html code in an appropriate skin 232. The portion of the presentation browser application 228b on the head end 204 may then provide a revised code comprising the parsed code (e.g., user metadata and content) and, if required, instructions for how to display the user metadata and content within a selected skin 232 to the terminal device 216 via the device interface 212. The portion of the browser application 228a at the terminal device 216 may then simply render the user metadata and content for presentation within the selected skin 232. Although referred to herein as first and second portions of a browser application 228a-b, and although they may be operable to cooperate with one another, it should be appreciated that the browser application 228a and/or the browser application 228b are capable of operating independently of one another, when not operated as a composite presentation browser application 228.

Figure 3:
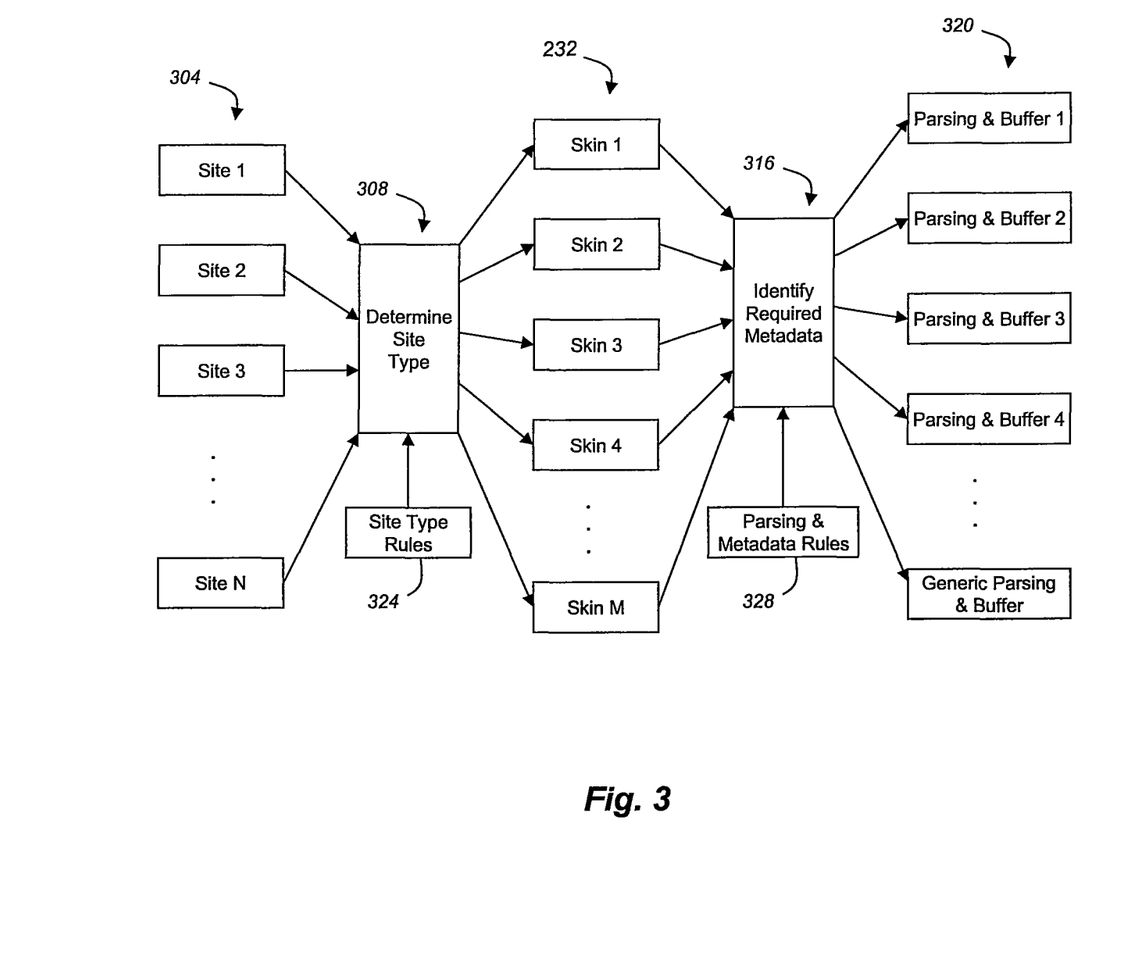
FIG. 3 is block diagram depicting a data mapping structure used in accordance with at least some embodiments of the present invention.

Referring now to FIG. 3, an exemplary data structure associated with or integral to the presentation browser application 228 will be described in accordance with at least some embodiments of the present invention. The data structure may utilize a mapping between websites or sites 304, skins 232, and parsing commands 320. More particularly, a site 304 may be mapped to a particular skin 232 based on site type mapping rules 324. The presentation browser application 228 may utilize a site type determination module 308 to apply site type mapping rules 324 to a particular site 304 to determine which presentation skin 232 should be used to frame user metadata and content extracted from the site 304.

In accordance with at least one embodiment of the present invention, the site type mapping rules 324 may define a one-to-one mapping between sites 304 and skins 232, whereby special skins 232 are provided for each site 304. This may be particularly useful if a web content provider associated with a site 304 would like to customize skins 232 used to present user metadata and content from their site 304. When a particular site 304 is selected for presentation, the site type mapping rules 324 would cause the browser application 228 to utilize a specific skin 232 for the selected site 304.

Alternatively, there may be a one-to-many mapping between sites 304 and skins 232. In this type of mapping a single site 304 may be mapped to several skins 232 and the selection of the skin 232 used to present the user metadata and content from the site 304 may be based upon user preferences or other considerations. Accordingly, the site type mapping rules 324 may include selection logic related to user preferences in addition to other predefined mapping criteria.

Still further in the alternative, a many-to-one mapping may be employed between sites 304 and skins 232. In this type of mapping structure a number of sites 304 may be categorized by type. Examples of skin 232 types include those for video content, audio content, text content, and multi-media content types. All sites 304 belonging to a common type may be mapped to a particular skin 232. Thus, skins 232 used to frame and present video-based websites may be different from skins 232 used to frame and present audio-based websites.

In yet another alternative, a many-to-many mapping between sites 304 and skins 232 may be employed. In a many-to-many mapping a single site 304 may be mapped to a plurality of skins 232 and a single skin 232 may be mapped to a plurality of sites 304. In this mapping configuration the site type mapping rules 324 are the most flexible and typically mapping logic is employed that utilizes preference information and other logic-based selection algorithms to map sites 304 to skins 232.

The presentation browser application 228 may also utilize a metadata and content selection module 316 to map parsing commands 320 to skins 232 and/or sites 304. Parsing and metadata rules 328 may be provided as an input to the metadata and content selection module 316 to identify the commands 320 that will be used to extract selected user metadata and content from html code retrieved from the servers 108a-N. The parsing and metadata rules 328 may comprise the metadata rules 236 and parsing rules 240 of the browser application 228 as well as instructions for combining and executing such rules.

The selection of commands 320 may vary based on the actual site 304 that has been selected and/or the skin 232 that has been selected for the site 304. For example, currently existing sites 304 are each coded uniquely, meaning that a different coding structure is used for each website's html code. Thus, a unique parsing command 320 may be required for existing websites. Furthermore, each website's parsed html code may be stored in a separate buffer such that it can be easily displayed and accessed within a skin 232.

There may be instances, however, where the website 304 is coded according to a standard format that allows the use of a generic set of parsing commands 320.

Accordingly, the parsing and metadata mapping rules 328 may enforce a one-to-one mapping between sites 304 and parsing commands 320 (e.g., when each site 304 has a unique coding scheme) or the parsing and metadata mapping rules 328 may enforce a many-to-one mapping between sites 304 and a generic set of parsing commands 320 (e.g., when multiple sites 304 are coded according to a standard coding scheme that can be parsed and buffered by the generic set of parsing commands 320).

In general, sites 304 are resident on servers 108 and are made available to the presentation browser application running on the client 112 via the communication network 104. As previously indicated, the site type determination module 308, skins 232, metadata and content selection module 316, parsing commands 320, site type mapping rules 324, and parsing and metadata rules 328 may all be provided as components that are part of or adjuncts to the presentation browser application 228. In addition, these components may be stored in and/or implemented by one or more elements of the client 112. For example, some or all of the components may be implemented by the execution of the presentation browser application 228 code by the terminal device 216. As a further example, some or all of the components may be implemented by the execution of presentation browser application code 228 by the head end 204.

Figure 4:
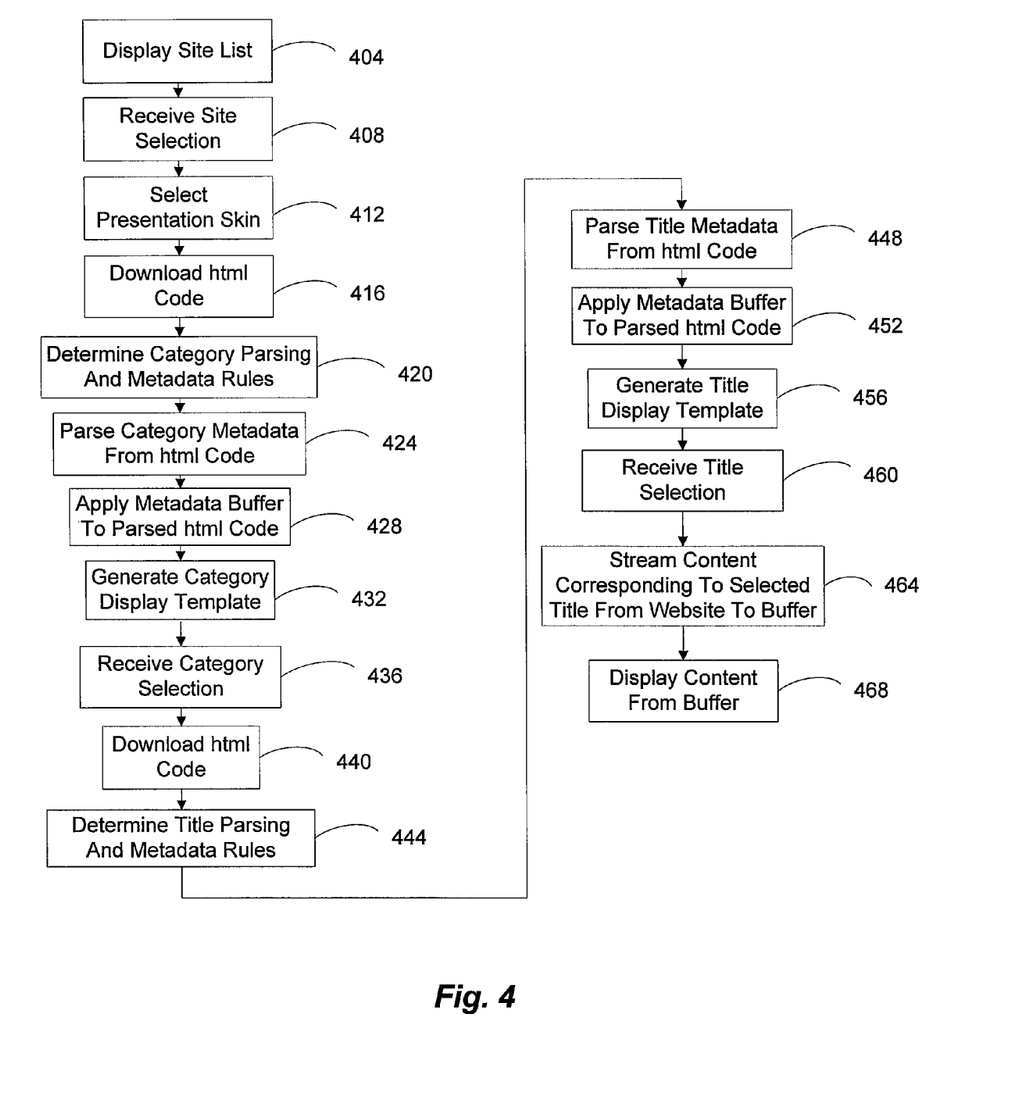
FIG. 4 is a flow diagram depicting a website content retrieval and display method in accordance with at least some embodiments of the present invention.

Referring now to FIG. 4, an exemplary website browsing method implemented in connection with the operation of a presentation browser 228 will be described in accordance with at least some embodiments of the present invention. The method is initiated when a list of sites 304 is displayed to the user (step 404). The list of sites 304 may be displayed via the display 256 of the output device 248. The user may utilize the input device 244 to make a site 304 selection which is then received at the presentation browser application 228 (step 408).

Upon receipt of the site selection, a presentation skin 232, 232 is selected based on the site 304 that was selected (step 412). More particularly, the selected site 304 may be mapped to a particular presentation skin 232 based on the site type mapping rules 324. With the presentation skin 232, 232 selected, the presentation browser application 228 continues by requesting and downloading the data (e.g., html code, java script, xml script, etc.) corresponding to the selected website 304 (step 416). This download step may include sending a URL associated with the selected site to a server 108 that is responsible for maintaining the selected site. In accordance with at least some embodiments of the present invention, the data is downloaded across the communication network 104 in its complete form.

Upon receiving the requested executable code, the presentation browser application 228 determines category parsing and metadata commands that will be used to extract selected metadata and content from the data (step 420). In this step, the presentation browser application 228 may utilize the metadata and content selection module 316 to apply parsing and metadata mapping rules 328 based on the selected site. Application of the parsing and metadata mapping rules 328 causes the metadata and content selection module 316 to select the appropriate parsing commands 320 that will be applied to the received data. The parsing commands 320 may be selected from a list of possible parsing commands that include parsing commands that are specific to particular sites and a generic set of parsing commands that can be used for a plurality of sites.

The presentation browser application 228 then utilizes the selected parsing commands 320 to parse the category or user metadata and content from the website data (step 424). In this parsing step, the browser application 228 may flag selected portions (e.g., characters, strings of characters, and other subsets of the data associated with category information) within the data without actually executing or rendering the browser metadata included in the data received from the site 304 that would control the presentation of the content included in the data if received by a conventional browser. The selected portions of the data are flagged in accordance with the selected parsing commands. In accordance with at least one embodiment of the present invention, user metadata and content are initially flagged by the browser application 228 during the parsing step. After parsing the received data, the presentation browser application 228 continues to apply the buffer commands to the parsed data (step 428). In this step, the presentation browser application 228 extracts the flagged user metadata and content from the data and conditions it for presentation within the selected skin 232. This step is also performed without actually executing the executable code. Accordingly, embodiments of the present invention replace the formatting and other commands contained in browser controls, some or all aspects of the presentation of content from a metadata that particular site 324 by a conventional browser with a format provided by a skin 232 that is not obtained from the site 304. That is, a presentation browser 228 in accordance with embodiments of the present invention substitutes formatting information included in data received from a website 304 with a format provided by the presentation browser 228 itself or by some source other than the data provided by the website 304 with the website content.

As can be appreciated, the downloading, parsing, and buffering of metadata and content may be simultaneously performed on a plurality of sets of data, each of which may correspond to a different address within a given website domain. For example, during the preparation of category information for a selected website all of the addresses associated with the domain name of the selected website may be parsed and buffered for relevant metadata and content.

After the user metadata and content have been parsed and extracted from the data, the presentation browser application 228 continues by generating a category display template (step 432). The category display template presents to the user categories of content that can be viewed, heard, and/or read from the selected website. The category metadata is generally displayed in a first window of the selected skin 232 via the user display 256 while category content is generally displayed in a second window of the selected skin 232 of the user display 256. The displayed categories may be obtained from the user metadata and may correspond to a list of browsing options for the selected site 304, and/or may correspond to a feature video or other type of feature content associated with the website.

The user is then allowed to select a category from the category metadata by using the user input device 244. The category selection is received at the presentation browser application 228 (step 436), which in turn causes the presentation browser application 228 to load or download the data associated with the selected category (step 440). This category data can include loading a page preprovisioned by the presentation browser 228 or an associated module for presenting available categories, or can comprise downloading information regarding content available from a particular website or group of website 304.

Upon receiving the requested data, the presentation browser application 228 determines title parsing and metadata commands that will be used to extract selected (i.e., title) user metadata and content from the data (step 444). In this step, the presentation browser application 228 may again utilize the metadata and content selection module 316 to apply parsing and metadata mapping rules 328 based on the selected site. Application of the parsing and metadata mapping rules 328 causes the metadata and content selection module 316 to select the appropriate parsing commands 320 that will be applied to the received data. The parsing commands 320 may be selected from a list of possible parsing commands that include parsing commands that are specific to particular sites and a generic set of parsing commands that can be used for a plurality of sites or domains.

The presentation browser application 228 then utilizes the selected parsing commands 320 to parse the title user metadata and content from the website data (step 448). In the parsing step the presentation browser application 228 flags selected portions (e.g., characters, strings of characters, and other subsets of the data associated with title information) within the data without actually executing html or other browser metadata. The selected portions of the data are flagged in accordance with the selected parsing commands. In accordance with at least one embodiment of the present invention, user metadata and content are initially flagged with a logic bit or flag by the browser application 228 during the parsing step. After parsing the data, the presentation browser application 228 continues to apply the buffer commands to the parsed data (step 452). In this step, the presentation browser application 228 extracts the flagged user metadata and content (e.g., title metadata and content)

from the data and conditions it for presentation within the selected skin 232. This step is also performed without actually executing any executable code included in the data received from the website 304.

After the title user metadata and content have been parsed and extracted from the data, the browser application 228 continues by generating a title display template (step 456). The title display template presents titles of items or types of content that can be viewed, heard, and/or read from the selected website. The title user metadata is generally displayed in a first window of the selected skin 232 via the user display 256 while category content corresponding to a selected title is generally displayed in a second window of the selected skin 232 of the user display 256. More particularly, the displayed title user metadata may correspond to a list of titles that can be selected for viewing by the user. When a title in the first window is highlighted (but not selected) a preview of content associated with that title may be displayed in the second window. In accordance with at least one embodiment of the present invention, the content that is displayed when a particular title is highlighted may be content that was retrieved from the same data from a particular address (i.e., html code from a particular URL) as the user metadata that correspond to the highlighted title.

The method continues when a user selects a particular title and the title selection is received at the presentation browser application 228 (step 460). Upon receiving the title selection, a unique content from a unique web address or URL has been selected. The content from that particular web address is streamed from the server 108 responsible for the selected website to a buffer within the memory 224 of the terminal device 216 (step 464). After a predetermined amount of content has been stored in the buffer, the content is provided to the user on the output device 248 (step 468). In this particular step, the content may be displayed in a window or in a full screen view of the display 256 and/or transmitted through the audio output 252.

After the content has been provided to the user, a number of options may be available to the user. One option that the user may select is to view the content over again. In such a situation, the content can be replayed to the user directly from the buffer. Another option that the user may select is to go back to the title screen to select another title to view. Yet another option that may be available to the user is the option to go back to the category template that is associated with the originally selected site. Still another option that might be available to the user is to allow the user to go back to the home screen where the site selection list was provided to the user.

Figure 5:
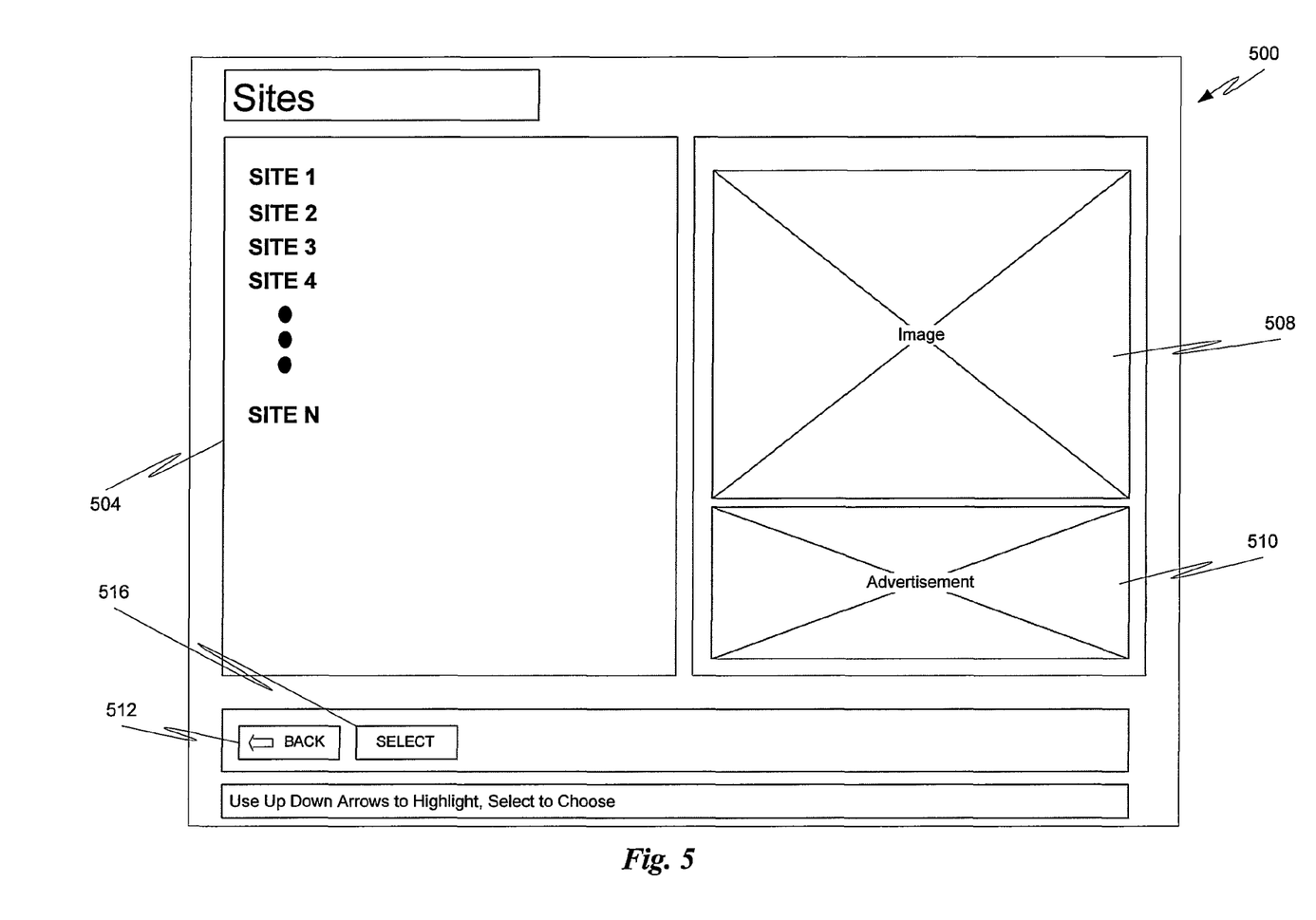
FIG. 5 depicts a site list window in accordance with embodiments of the present invention.

Referring now to FIGS. 5-8, a series of exemplary browser interface screen-shots that may be presented by a presentation browser application 228 in accordance with embodiments of the present invention are described. FIG. 5 depicts a site list window 500 that is presented to the user. The site list window 500 may comprise a window that corresponds to a home page for the presentation browser application 228. Any websites that are available for viewing via the presentation browser application 228 are listed in a first display frame 504 of the display 256. A second frame 508 may be utilized to display content previews for a highlighted title in the first frame 504. In accordance with at least some embodiments of the present invention, a different content preview or icon is associated with each title in the first frame 504. The data used to populate the first window 504 may correspond to user metadata recovered from a plurality of different websites whereas the content in the second frame 508 may correspond to content recovered from the website associated with a highlighted or selected item displayed in the first frame 504. Alternatively, the site list screen 500 may present only those websites 304 that are or have been made compatible with the presentation browser application 228.

In addition to the frame 504 used to present user metadata and the frame 508 used to present content, the browser interface may also comprise a third frame 510 for displaying advertisement content. The nature of the advertisement content may be determined based on the content presented in the first frame 504 or second frame 508. Alternatively, the content of the advertisement depicted in the third frame 510 may be selected from the html code as user metadata.

The browser interface may further comprise controls 512, 516 for navigating the interface. The controls 512, 516 are relatively simple controls that are designed for use with a relatively simple user input device 244. The user may simply toggle through items and/or sections presented by the browser interface (i.e., site selections possibilities, and the navigation controls 512, 516) by using arrows or tab keys provided by the user input 112 and then may select the appropriate control 512, 516 or title, for example by pressing an "enter" or "OK" key of the user input 112, when it is highlighted. The browser interface may further comprise a navigation instruction section 520 that displays navigation help information. In accordance with at least one embodiment of the present invention, the information displayed in the navigation instruction section 520 may be generic navigation instructions that are specific to the site list screen 500. Alternatively, the information displayed in the navigation instruction section 520 may alter depending upon which section of the browser interface is highlighted. More specifically, the user may be provided with information related to the functionality of a highlighted section as well as how to utilize the highlighted section.

Figure 6:
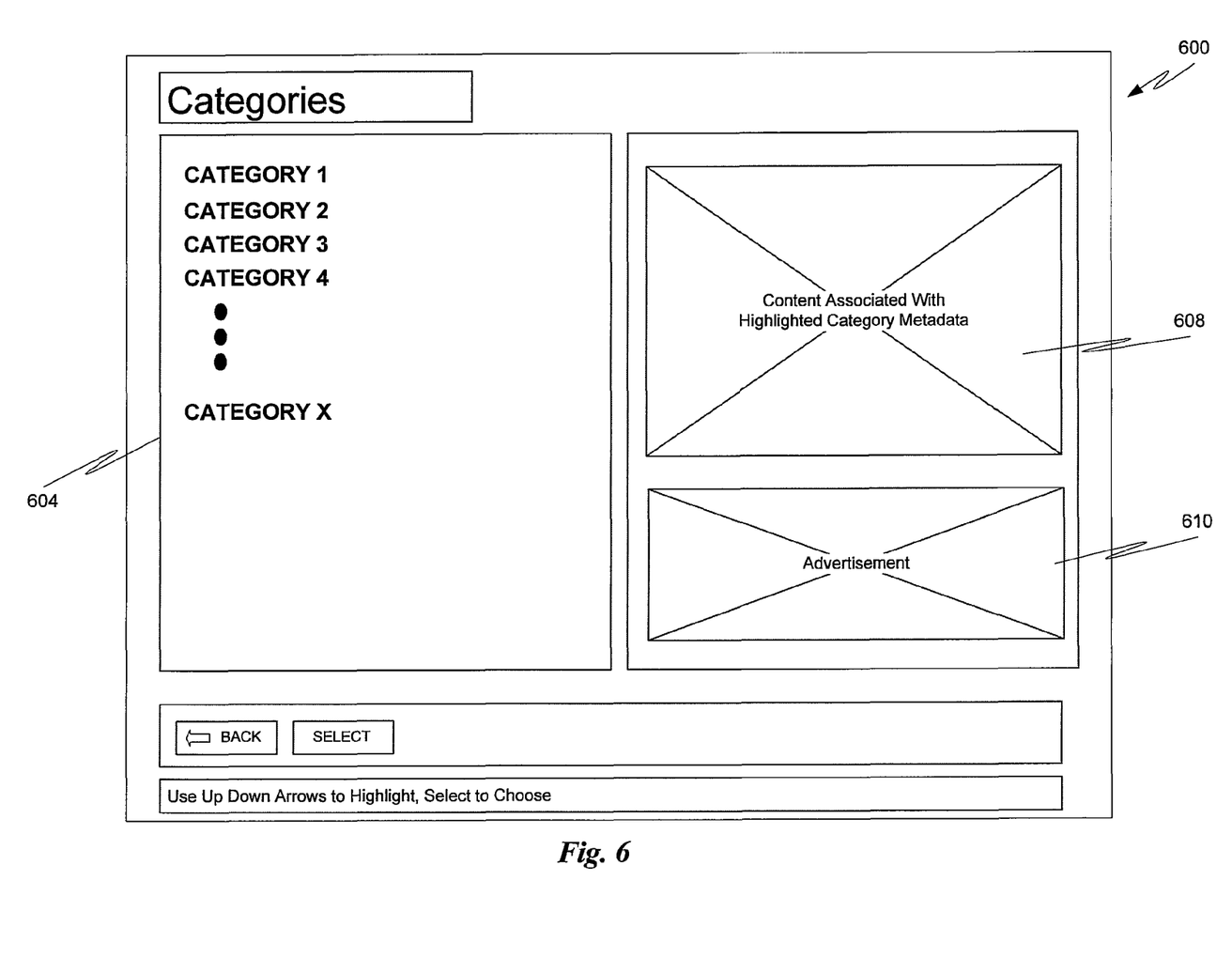
FIG. 6 depicts a category window in accordance with embodiments of the present invention.

FIG. 6 depicts an exemplary category window 600. The category window 600 may be a sub-screen of the site list screen 500, meaning that different category screens 600 may be displayed to a user depending upon which site was selected in the site list screen 500. The skin 212 used to frame the data on the category window 600 may be selected based on the type of site that was selected from the site list screen 500. The category window 600 may also comprise a first 608, second 608, and third 810 frames for presenting user metadata and/or content from a selected website. More specifically, user metadata from a plurality of addresses associated with a selected website (e.g., a selected domain) may be presented in the first frame 604 while content from the selected website is presented in the second frame 608. Advertisements either provided independent of the html code or parsed from the html code as user metadata may be displayed in the third frame 810. Similar to the site list screen 500, the content that is displayed in the second frame 608 and/or third frame 810 may vary depending upon the category that is highlighted in the first frame 604. As can be appreciated by one skilled in the art, although only three frames are depicted a greater or lesser number of frames may be provided on the user interface. The number of frames provided for a particular skin 232 may vary depending upon the nature of the content displayed in the skin 232 as well as the preferences of the user and/or website content provider.

Figure 7:
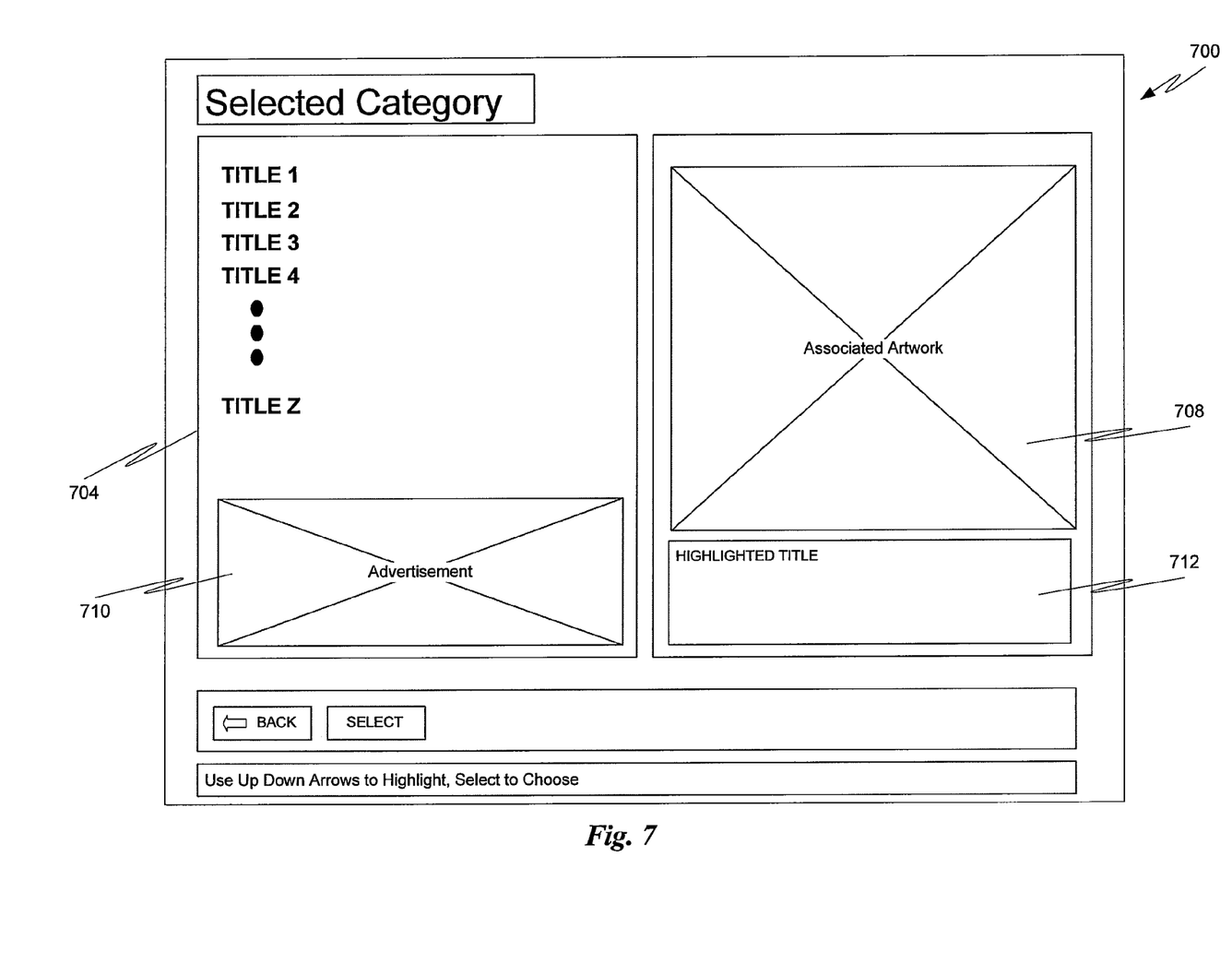
FIG. 7 depicts a title screen window in accordance with embodiments of the present invention.

FIG. 7 depicts an exemplary title window 700. The title window 700 may comprise a first frame 704, a second frame 708, and a third frame 710. The first frame 704 may be utilized to display user metadata information comprising the available titles within a selected category. Thus, the title window 700 may be a sub-screen of the category screen 600.

The metadata displayed in the first frame 704 may be retrieved from a plurality of addresses associated with a common category. At the top of the title screen, the name of the category that was selected in the category screen 600 may be displayed. The second frame 708 may be utilized to display content and other artwork associated with a highlighted title. The third frame 710 may depict advertisement content that has either been retrieved from the html code or provided from some other source (e.g., a predefined advertisement stored on the head end 204 or terminal device 216). Furthermore, a portion 712 of the second frame 708 may be used to display all of the metadata that is highlighted in the first frame 704.

Figure 8:
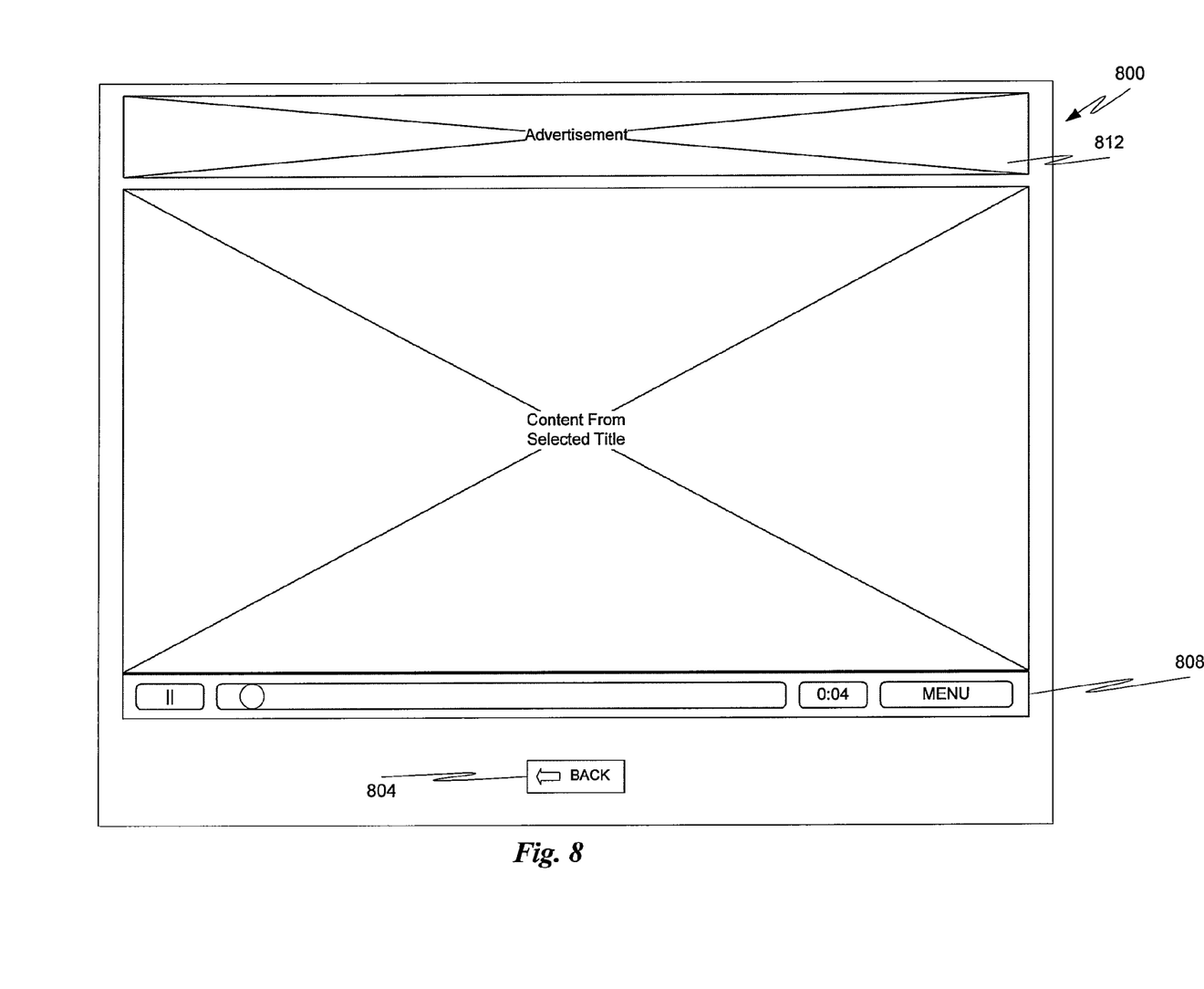
FIG. 8 depicts a full content display window in accordance with embodiments of the present invention.

FIG. 8 depicts an exemplary full content display window 800. The full content display window 800 may be used to display content associated with a title that was selected on the title screen 700. Therefore, the full content display window 800 may be a sub-screen of the title screen 700. At this point, the format of the skin 232 may be altered such that the content from the selected website 304 is displayed on a majority of the display 256. A small portion of the screen may be used for navigation and control purposes. For example, a browser navigation control button 804 may be provided below the frame depicting or displaying the content of the website. Additionally, a website navigation toolbar 808 may be provided to control the playback of the content. The website navigation toolbar 808 may comprise similar functionality to the navigation toolbar that would be displayed if the entire code for the selected page of data received from the website 304 were executed. More specifically, a play and scroll control may be provided in the website navigation toolbar 808. This toolbar 808 allows a user to control the playback of the content whereas the browser navigation control button 804 controls the navigation within the browser (i.e., controls whether the user browses back to the title window 700, category window 600, or site list window 500. The full content display window 800 may further comprise a frame for displaying advertisements 812 or the like along with the selected content.

While the above-described flowchart and screen-shots have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit elements, an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on a personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for displaying content retrieved from servers. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method for presenting dynamic content, comprising:
   receiving a request for content from a website by a presentation browser application;
   providing to a network interface the request for content for delivery to the web site;
   in response to the request for content, receiving browser metadata including executable code that controls a presentation of content, user metadata describing content available to a user, and content data at the presentation browser application;
   selecting parsing rules to be applied to the browser metadata, user metadata, and content data, the selected parsing rules being dependent on the website;
   parsing the received browser metadata, user metadata, and content data according to the selected parsing rules to separately flag at least the user metadata and the content data such that the browser metadata remains unexecuted;
   extracting at least the flagged user metadata and the content data such that the browser metadata remains unexecuted;
   selecting a first browser presentation window from a plurality of browser presentation windows, wherein the first browser presentation window is determined to be suitable for displaying content from the website;
   displaying extracted user metadata in a first frame of a window of the presentation browser application, wherein a format of the first frame and the first browser presentation window is defined by the presentation browser application;

displaying extracted content data in a second frame of the presentation browser application, wherein a format of the second frame and the relationship of the second frame to the first frame is defined by the presentation browser application; and displaying advertisement content in a third frame of the presentation browser application, wherein the advertisement content is based on at least one of the first frame, the second frame, or the user metadata.

2. The method of claim 1, wherein the request for content is for content of a first type, wherein the selected first browser presentation window is for use with content of the first type, and wherein a second browser presentation window included in the plurality of browser presentation windows is for use with content of a second type.

3. The method of claim 2, further comprising:
receiving a request for content of the second type; and
in response to receiving the request for content of the second type, selecting the second browser presentation window, wherein the second browser presentation window is determined to be suitable for displaying content from the website.

4. The method of claim 2, wherein the first browser presentation window is determined to be suitable for displaying content of the first type from the website based on received metadata.

5. The method of claim 2, wherein information included in received metadata is displayed in a first frame of the first browser presentation window and the content of the first type is displayed in a second frame of the first browser presentation window.

6. The method of claim 1, wherein the presentation browser application is executed by a terminal device.

7. The method of claim 6, wherein the request for content is input by a user through a remote control device in wireless communication with the terminal device.

8. The method of claim 1, wherein the presentation browser application is executed by a head end system, wherein the head end system is in communication with a terminal device, and wherein the request for content is input by a user through a remote control device in wireless communication with the terminal device.

9. The method of claim 1, wherein the browser metadata includes html code, and wherein the html code is not executed by the presentation browser application.

10. A presentation browser, comprising:
presentation browser application code, including:
a plurality of presentation formats, wherein each presentation format of the plurality of presentation formats includes a plurality of predefined areas for presenting content received from a remote source, wherein the content received from the remote source includes browser metadata including executable code controlling a presentation of content, user metadata describing content available to a user, and content data,
a plurality of parsing rules, wherein selected parsing rules of the plurality of parsing rules are applied to content received from the remote source, the selected parsing rules being dependent upon the remote source, and
a plurality of parsing commands, wherein the plurality of parsing commands includes a set of parsing commands that is specific to a particular remote source and a generic set of parsing commands usable for a plurality of remote sources, wherein selected parsing commands are based on the selected parsing rules and are applied to content received from the remote source to parse received browser metadata, user metadata, and content data according to the selected parsing rules, and wherein at least the user metadata and the content data are separately flagged and extracted such that the browser metadata remains unexecuted;

a processor running said presentation browser application code; and a display, wherein extracted user metadata is displayed in a first area included in the plurality of predefined areas of a selected first one of the presentation formats, wherein c extracted content data is displayed in a second area included in the plurality of predefined areas of the selected first one of the presentation formats, and wherein advertisement content is displayed in a third area included in the plurality of predefined areas of the selected first one of the presentation formats, wherein the advertisement content is based on at least one of the first area, the second area, or the user metadata.

11. The browser of claim 10, wherein the selected first one of the presentation formats is for use with the content of a first type, and wherein a non-selected second one of the presentation formats is for use with at least content of a third type.

12. The browser of claim 11, wherein the selected first one of the presentation formats is determined to be suitable for displaying content of a first type and a second type from a website based on metadata received in connection with the content of the first type.

13. A terminal device comprising the browser of claim 10.

14. A head end comprising the browser of claim 10, wherein the browser is executed by a head end system, wherein the head end system is in communication with a terminal device, and wherein a request for content is input by a user through a remote control device in wireless communication with the terminal device.

15. The browser of claim 10, wherein the content received from a remote source comprises executable code and wherein the content of first and second types are displayed without executing at least a portion of executable code.

16. The browser of claim 15, wherein the executable code comprises at least one of html code, java script, and xml script.

17. A method, comprising:
receiving executable code from a web server, wherein the executable code includes browser metadata that controls a presentation of content, user metadata that describes content available to a user, and content data;
parsing the executable code according to selected parsing rules using a selected subset of a plurality of parsing commands to identify first and second portions of the executable code, wherein the first portion of the executable code includes browser metadata and the second portion includes user metadata, and wherein the selected subset of the plurality of parsing commands is particular to a web server;
ignoring the first portion of the executable code such that the first portion remains unexecuted;
extracting at least some of the second portion of the executable code;
causing at least some of the second portion of the executable code to be displayed in a presentation skin, wherein the presentation skin is selected based on a site type and is displayed in substitution for the first portion of the executable code; and causing advertisement content to be displayed in the presentation skin, wherein the advertisement content is based on the second portion of the executable code.

18. The method of claim 17, wherein the at least some of the second portion of the executable code includes user metadata and content data, and wherein the content data and user metadata are retrieved from a common address maintained by the web server, the method further comprising:

displaying the user metadata in a first window of the presentation skin; and displaying the content data in a second window of the presentation skin.

19. The method of claim 18, wherein ignoring comprises failing to execute at least a portion of the executable code.

20. The method of claim 17, wherein the executable code comprises at least one of html code, java script, and xml script.

* * * * *